United States Patent
Tian et al.

(10) Patent No.: US 9,088,365 B2
(45) Date of Patent: Jul. 21, 2015

(54) OPTICAL PHASE CONJUGATION AIDED LONG-HAUL TRANSMISSION SYSTEM WITH ENHANCED SIGNAL-TO-NOISE RATIO AND NONLINEAR TOLERANCE

(71) Applicant: NEC Laboratories America, Inc., Princeton, NJ (US)

(72) Inventors: Yue Tian, Princeton, NJ (US); Yue-Kai Huang, Princeton, NJ (US); Shaoliang Zhang, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 12 days.

(21) Appl. No.: 14/044,530

(22) Filed: Oct. 2, 2013

(65) Prior Publication Data

US 2014/0099127 A1   Apr. 10, 2014

Related U.S. Application Data

(60) Provisional application No. 61/709,527, filed on Oct. 4, 2012.

(51) Int. Cl.
- *H04B 10/00* (2013.01)
- *H04B 10/2507* (2013.01)
- *H04B 10/2543* (2013.01)
- *H04B 10/50* (2013.01)
- *H04B 10/61* (2013.01)

(52) U.S. Cl.
CPC ........ *H04B 10/2507* (2013.01); *H04B 10/2543* (2013.01); *H04B 10/50* (2013.01); *H04B 10/61* (2013.01)

(58) Field of Classification Search
CPC ........... H04B 10/2507; H04B 10/2543; H04B 10/50; H04B 10/61
See application file for complete search history.

(56) References Cited

U.S. PATENT DOCUMENTS

| | | | | |
|---|---|---|---|---|
| 6,160,942 A | * | 12/2000 | Watanabe | 385/122 |
| 6,307,984 B1 | * | 10/2001 | Watanabe | 385/24 |
| 6,704,519 B1 | * | 3/2004 | Brener et al. | 398/160 |
| 7,558,485 B2 | * | 7/2009 | Chowdhury et al. | 398/150 |
| 2005/0058459 A1 | * | 3/2005 | Chandrasekhar et al. | 398/161 |
| 2006/0051039 A1 | * | 3/2006 | Wei | 385/123 |
| 2007/0206963 A1 | * | 9/2007 | Koc | 398/202 |
| 2010/0178065 A1 | * | 7/2010 | Nishihara et al. | 398/202 |
| 2012/0177386 A1 | * | 7/2012 | Zhou et al. | 398/208 |
| 2012/0224855 A1 | * | 9/2012 | Liu et al. | 398/79 |
| 2013/0315607 A1 | * | 11/2013 | Sadot et al. | 398/159 |

OTHER PUBLICATIONS

Liu et al; Scrambled coherent superposition for enhanced optical fiber communication in the nonlinear transmission regime; Aug. 2012; optical society of America.*

Pelusi et al; optical phase conjugation by an As2S3 glass planar waveguide for dispersion free transmision of WDM-DPSK signals over fiber; Dec. 2010; optical society of America.*

Kim et al; cross-phase modualtion induced Nonlinear phase noise in WDM direct detection DPSK systems; Aug. 2003; IEEE.*

* cited by examiner

*Primary Examiner* — Ken Vanderpuye
*Assistant Examiner* — Amritbir Sandhu
(74) *Attorney, Agent, or Firm* — Joseph Kolodka

(57) ABSTRACT

A long haul transmission system uses a digital signal processor DSP instead of an additional optical phase conjugate copier because the optical phase conjugate copier requires high quality optical carrier regeneration to recover the pump and optical PLL to maintain phase matching between signal and pump. Therefore, the use of DSP to process the signal and idler at receiver end greatly simplifies the system setup, increases the system stability and decreases the system cost.

14 Claims, 1 Drawing Sheet

OPTICAL PHASE CONJUGATION AIDED LONG-HAUL TRANSMISSION SYSTEM WITH ENHANCED SIGNAL-TO-NOISE RATIO AND NONLINEAR TOLERANCE

This application claims the benefit of U.S. Provisional Application No. 61/709,527, filed Oct. 4, 2012, of which the contents are incorporated herein by reference.

BACKGROUND OF THE INVENTION

The present invention relates generally to optical communications and, more particularly, to optical phase conjugation aided long-haul transmission system with enhanced signal-to-noise ratio and nonlinear tolerance.

As 100-Gb/s coherent optical communication systems are commercially available for long-haul optical transmission systems. Linear distortion such as chromatic dispersion (CD) and polarization mode dispersion (PMD) can be completely compensated by digital signal processing (DSP) algorithms in principle. Thus optical noise accumulation and non-linear impairment are the main factors that limit system reach. One way to overcome optical noise accumulation is to increase signal power. However, in fiber links higher signal power induces more non-linear impairment as well, which harms the signal quality and shorten the system reach.

In previous works, degenerated and non-degenerated phase sensitive amplifiers (PSAs) are proposed to increase the optical signal-to-noise ratio (OSNR) and mitigate the nonlinear phase noise. However, due to the high requirement of the phase match between the pump and signal, both approaches need high quality carrier regeneration technology and feedback optical phase lock loop (PLL) to maintain phase coherence between the pump and signal. Moreover, they require twice of phase conjugation operations done in optical domain, which requires two sets of optical phase conjugation setups. Therefore, the system setup is much more complicated and the system cost is largely increased.

Accordingly, there is a need for a a long haul transmission system that overcomes limitations of prior efforts.

BRIEF SUMMARY OF THE INVENTION

In an aspect of the present invention, transmission system includes a transmitter for transmitting an optical signal; a phase conjugate copier for generating a phase conjugate duplicate of an original optical signal called idler components; a transmission link coupled to an output from the phase conjugate copier; coherence receivers coupled to the transmission link for separately receiving the optical signal and the idler components, respectively; and a digital signal processor for receiving the separated optical signal and idler components for conjugating in phase the idler signal and adding it to the received optical signal in a digital domain enabling nonlinear phase shifts on the optical signal and idler components to cancel out each other.

In a similar aspect of the present invention, a method in an optical transmission system includes transmitting an optical signal by a transmitter; generating with a phase conjugate copier a phase conjugate duplicate of an original optical signal called idler components; providing a transmission link coupled to an output from the phase conjugate copier; separately receiving, with coherence receivers coupled to the transmission link, the optical signal and the idler components, respectively; and receiving into a digital signal processor the separated optical signal and idler components for conjugating in phase the idler signal and adding it to the received optical signal in a digital domain and enabling nonlinear phase shifts on the optical signal and idler components to cancel out each other.

These and other advantages of the invention will be apparent to those of ordinary skill in the art by reference to the following detailed description and the accompanying drawings.

DETAILED DESCRIPTION

The invention is directed to solving the problem of optical noise accumulation and non-linear impairment in long-haul transmission systems by using an optical phase conjugate copier and DSP aided coherent receivers. The optical phase conjugate copier generates phase conjugate duplicate of original optical signal, called idler. Then after transmission at the receiver end, the signal and idler are separately received by two coherence receivers. In the following DSP module, the idler component is conjugated in phase and then added with received signal component in digital domain. Consequently, the nonlinear phase shifts on signal and idler components cancel out each other. Moreover, by adding up the signal and idler components, the signal amplitude is increased, resulting in optical-signal-to-noise-ratio OSNR enhancement.

Figure 1:
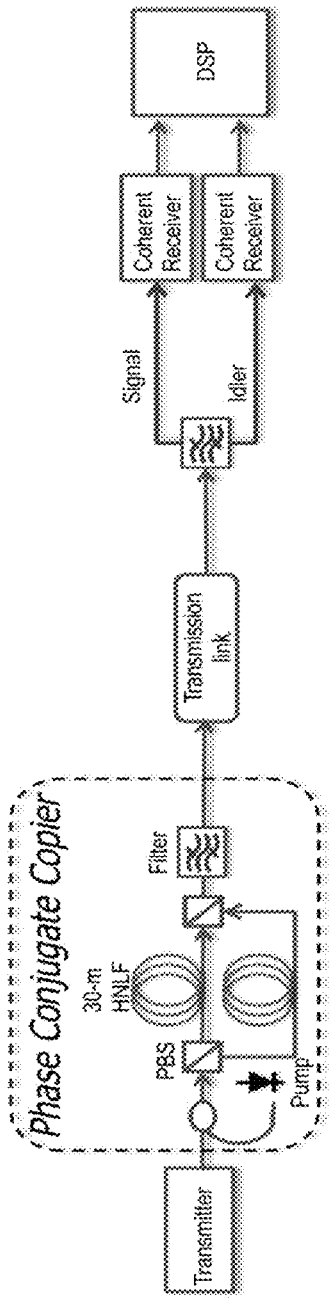
FIG. 1 is a diagram of an optical phase conjugation aided long-haul transmission system with enhanced signal-to-noise ratio and nonlinear tolerance; in accordance with the invention.

FIG. 1 is a diagram of an optical phase conjugation aided long-haul transmission system with enhanced signal-to-noise ratio and nonlinear tolerance; in accordance with the invention. An optical phase conjugate copier is inserted before the transmission link. In the phase conjugate copier, the optical signal is coupled with a strong continues-wave (CW) pump light, which is at 45 degree with respect of the signals. A polarization beam splitter (PBS) is used to demultiplex the two orthogonal polarization components and project the pump light equally onto the two polarization axes. In each branch, four-wave mixing (FWM) is performed through 30-m highly nonlinear fiber (HNLF). Note that the signal phase $\theta_s$, pump phase $\theta_p$ and newly generated idler phase $\theta_i$ satisfy the phase-relation $\theta_s + \theta_i = 2\theta_p$ and for continuous wave (CW) pump $\theta_p = 0$, so it gives $\theta_i = -\theta_s$. Thus the idler is a conjugate duplicate of the signal. Then another PBS followed by a notch filter is employed to combine the two branches again and filter out residual pump light. Finally, both the signal and idler are pre-amplified and launched into transmission link.

During transmission, since the nonlinear phase shift induced by self-phase modulation (SPM) and cross-phase modulation (XPM) is proportional to optical power, the similar amplitude fluctuations of signal and idler generate similar nonlinear phase noise $\theta_{NL}$. Thus, the signal phase and idler phase are $\theta_s + \theta_{NL}$ and $\theta_i + \theta_{NL}$ respectively before they reach the receiver. At the receiver end, the signal and idler components are separated by an optical filter and launched into two coherent receivers. The demodulated electrical QPSK signal and idler from the coherent receivers are fed into a DSP module, where CD, PMD and frequency offset between signals and LOs are electronically compensated. In addition to electronic equalization, a phase conjugate operation is performed on the QPSK idler component, which results in a phase information of $-\theta_i-\theta_{NL}$. At the end, signal component and the conjugated idler component are added up in electrical domain and get the electric-field sum $e^{\theta_s+\theta_{NL}}+e^{-\theta_i-\theta_{NL}}=2\cos\theta_{NL}\cdot e^{\theta_s}$. Therefore, the signal phase is corrected to $\theta_s$, and the signal strength is nearly doubled given that $\theta_{NL}$ is small.

Figure 2:
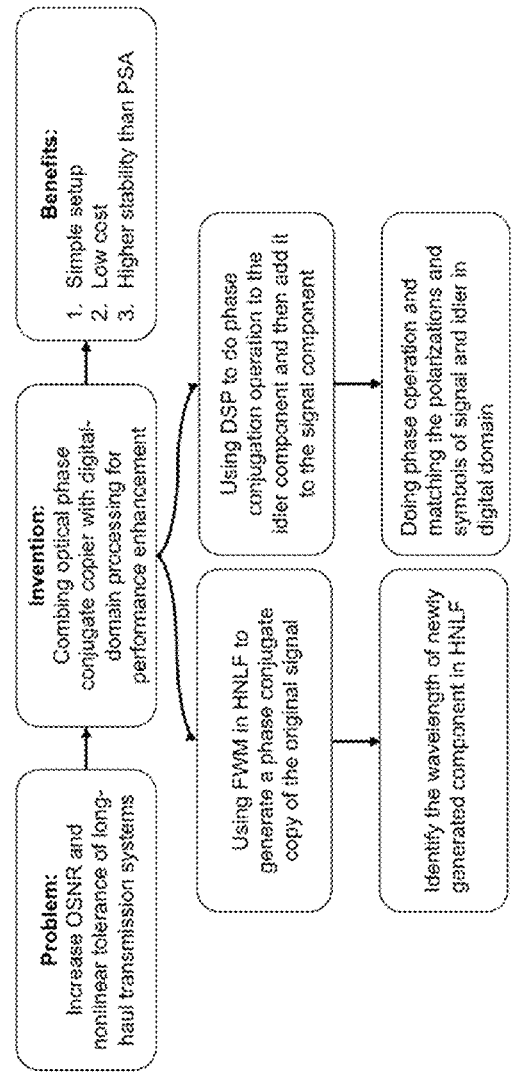
FIG. 2 is block diagram of aspects of the long haul transmission system, in accordance with the invention.

Turning now to FIG. 2, there is a diagram showing aspects of the inventive long haul transmission system. To address the problem of increased OSNR and nonlinear tolerance of long-haul transmission systems an in inventive optical phase conjugate copier with digital domain processing for performance enhancement is employed. The resulting configuration is a simple setup, low cost and has higher stability than phase sensitive amplifiers PSA. The inventive conjugate copier and digital domain processing employs: 1) four-wave mixing FWM in highly nonlinear fiber HNLF to generate a phase conjugate copy of the original signal, and 2) a digital signal processor DSP to do phase conjugation operation to the idler component and then add it to the signal component. The phase conjugate copy of the original signal identifies the wavelength of newly generated components in HNLF. The DSP to do phase conjugation operation entails matching the polarizations and symbols of signal and idler in the digital domain.

From the foregoing it can be appreciated that the inventive Compared with PSAs, by doing the second phase conjugation and adding operation in digital domain, our scheme does not requires additional hardware to recover the pump and maintain the phase coherence between the optical signals and pumps, which simplifies the system and lowers down the cost. Combining optical phase conjugation in HNLF and digital-domain phase conjugation operation in a DSP is completely new. The DSP is usually used in coherent systems to compensate frequency offset between signals and pumps and compensate linear impairment. The present invention uses it to convert the idler component back to signal by phase conjugation operation in digital domain and sum it with the original signal to achieve enhanced OSNR and nonlinear tolerance. The present invention uses digital signal processing DSP instead of an additional optical phase conjugate copier because the optical phase conjugate copier requires high quality optical carrier regeneration to recover the pump and optical PLL to maintain phase matching between signal and pump. Therefore, the use of DSP to process the signal and idler at the receiver end greatly simplifies the system setup, increases the system stability and decreases the system cost.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. An optical transmission system comprising:
   a transmitter for transmitting an optical signal;
   a phase conjugate copier for generating a phase conjugate duplicate of an original optical signal called idler components;
   a transmission link coupled to an output from the phase conjugate copier;
   coherence receivers coupled to the transmission link for separately receiving the optical signal and the idler components, respectively; and
   a digital signal processor for receiving the separated optical signal and idler components for conjugating in phase the idler signal and adding it to the received optical signal in a digital domain enabling nonlinear phase shifts on the optical signal and idler components to cancel out each other;
   wherein at the receivers, the signal and idler components are separated by an optical filter and launched into two coherent receivers and the demodulated electrical QPSK signal and idler from the coherent receivers are fed into a digital signal processor DSP module, where chromatic dispersion CD, polarization mode dispersion PMD and frequency offset between signals and local oscillators LOs are electronically compensated.

2. The system of claim 1, wherein in the phase conjugate copier, the optical signal is coupled with a strong continuous-wave (CW) pump light, which is at 45 degree with respect of the signals and a polarization beam splitter (PBS) is used to demultiplex the two orthogonal polarization components and project the pump light equally onto two polarization axes.

3. The system of claim 2, wherein in each branch, four-wave mixing (FWM) is performed through 30-m highly nonlinear fiber (HNLF).

4. An optical transmission system comprising:
   a transmitter for transmitting an optical signal;
   a phase conjugate copier for generating a phase conjugate duplicate of an original optical signal called idler components;
   a transmission link coupled to an output from the phase conjugate copier;
   coherence receivers coupled to the transmission link for separately receiving the optical signal and the idler components, respectively; and
   a digital signal processor for receiving the separated optical signal and idler components for conjugating in phase the idler signal and adding it to the received optical signal in a digital domain enabling nonlinear phase shifts on the optical signal and idler components to cancel out each other;
wherein phase conjugate copier includes generating a signal phase $\theta_s$, pump phase $\theta_p$ and newly generated idler phase $\theta_i$ satisfy the phase-relation $\theta_s+\theta_i=2\theta_i$ and for continuous wave (CW) pump $\theta_i=0$, so it gives $\theta_i=-\theta_s$, whereby the idler is a conjugate duplicate of the signal.

5. The system of claim 4, wherein another polarization beam splitter PBS followed by a notch filter is employed to combine the two branches again and filter out residual pump light and then, both the signal and idler are pre-amplified and launched into a transmission link.

6. The system of claim 1, wherein during transmission since the nonlinear phase shift induced by a self-phase modulation (SPM) and a cross-phase modulation (XPM) is proportional to optical power, similar amplitude fluctuations of signal and idler generate similar nonlinear phase noise $\theta_N$ and, the signal phase and idler phase are $\theta_s+\theta_{NL}$ and $\theta_i+\theta_{NL}$ respectively before they reach the receiver.

7. The system of claim 1, wherein a phase conjugate operation is performed on a quadrature phase shift key QPSK idler component, which results in a phase information of $-\theta_i-\theta_{NL}$, and then the optical signal component and the conjugated idler component are added up in an electrical domain and get an electric-field sum $e^{\theta_s+\theta_{NL}}+e^{-\theta_i-\theta_{NL}}=2\cos\theta_{NL}\cdot e^{\theta_s}$, thereby a signal phase is corrected to $\theta_s$, and a signal strength is nearly doubled given that $\theta_{NL}$ is small.

8. A method in an optical transmission system comprising the steps of:
- transmitting an optical signal by a transmitter;
- generating with a phase conjugate copier a phase conjugate duplicate of an original optical signal called idler components;
- providing a transmission link coupled to an output from the phase conjugate copier;
- separately receiving, with coherence receivers coupled to the transmission link, the optical signal and the idler components, respectively;
- receiving into a digital signal processor the separated optical signal and idler components for conjugating in phase the idler signal and adding it to the received optical signal in a digital domain and enabling nonlinear phase shifts on the optical signal and idler components to cancel out each other;
- wherein at the receivers, the signal and idler components are separated by an optical filter and launched into two coherent receivers and the demodulated electrical QPSK signal and idler from the coherent receivers are fed into a digital signal processor DSP module, where chromatic dispersion CD, polarization mode dispersion PMD and frequency offset between signals and local oscillators LOs are electronically compensated.

9. The method of claim 8, wherein in the phase conjugate copier, the optical signal is coupled with a strong continuous-wave (CW) pump light, which is at 45 degree with respect of the signals and a polarization beam splitter (PBS) is used to demultiplex the two orthogonal polarization components and project the pump light equally onto two polarization axes.

10. The method of claim 9, wherein in each branch, four-wave mixing (FWM) is performed through 30-*m* highly non-linear fiber (HNLF).

11. The method of claim 8, wherein phase conjugate copier includes generating a signal phase $\theta_s$, pump phase $\theta_p$ and newly generated idler phase $\theta_i$ satisfy the phase-relation $\theta_s + \theta_i = 2\theta_i$ and for continuous wave (CW) pump $\theta_i = 0$, so it gives $\theta_i = -\theta_s$, whereby the idler is a conjugate duplicate of the signal.

12. The method of claim 11, wherein another polarization beam splitter PBS followed by a notch filter is employed to combine the two branches again and filter out residual pump light and then, both the signal and idler are pre-amplified and launched into a transmission link.

13. The method of claim 8, wherein during transmission since the nonlinear phase shift induced by a self-phase modulation (SPM) and a cross-phase modulation (XPM) is proportional to optical power, similar amplitude fluctuations of signal and idler generate similar nonlinear phase noise $\theta_N$ and, the signal phase and idler phase are $\theta_s + \theta_{NL}$ and $\theta_i + \theta_{NL}$ respectively before they reach the receiver.

14. The method of claim 8, wherein a phase conjugate operation is performed on a quadrature phase shift key QPSK idler component, which results in a phase information of $-\theta_i - \theta_{NL}$, and then the optical signal component and the conjugated idler component are added up in an electrical domain and get an electric-field sum $e^{\theta_s + \theta_{NL}} + e^{-\theta_i - \theta_{NL}} = 2 \cos \theta_{NL} \cdot e^{\theta_s}$, thereby a signal phase is corrected to $\theta_s$, and a signal strength is nearly doubled given that $\theta_{NL}$ is small.

\* \* \* \* \*